United States Patent
Lakshman et al.

(10) Patent No.: US 10,740,300 B1
(45) Date of Patent: Aug. 11, 2020

(54) SYNCHRONIZATION OF METADATA IN A DISTRIBUTED STORAGE SYSTEM

(71) Applicant: Commvault Systems, Inc., Tinton Falls, NJ (US)

(72) Inventors: Avinash Lakshman, Fremont, CA (US); Lasaro Camargos, Uberlândia (BR); Deepak Jain, Delhi (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 165 days.

(21) Appl. No.: 15/834,921

(22) Filed: Dec. 7, 2017

(51) Int. Cl.
| | |
|---|---|
| G06F 7/00 | (2006.01) |
| G06F 17/00 | (2019.01) |
| G06F 16/178 | (2019.01) |
| G06F 11/14 | (2006.01) |
| G06F 16/13 | (2019.01) |
| G06F 16/2458 | (2019.01) |
| G06F 16/2457 | (2019.01) |
| G06F 16/182 | (2019.01) |
| G06F 16/27 | (2019.01) |

(52) U.S. Cl.
CPC ........ G06F 16/178 (2019.01); G06F 11/1464 (2013.01); G06F 16/137 (2019.01); G06F 16/2471 (2019.01); G06F 16/24573 (2019.01); G06F 16/182 (2019.01); G06F 16/275 (2019.01)

(58) Field of Classification Search
None
See application file for complete search history.

(56) References Cited

U.S. PATENT DOCUMENTS

| | | | |
|---|---|---|---|
| 4,084,231 | A | 4/1978 | Capozzi et al. |
| 4,267,568 | A | 5/1981 | Dechant et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Tuan A Pham
(74) *Attorney, Agent, or Firm* — Commvault Systems, Inc.

(57) ABSTRACT

A client machine writes to and reads from a virtual disk on a remote storage platform using a storage protocol. Metadata is generated and is stored in replicas on different metadata nodes of the storage platform. A modified log-structured merge tree is used to store and compact string-sorted tables of metadata. During file storage and compaction, a consistent file identification scheme is used across all metadata nodes. A fingerprint file is calculated for each SST file on disk that includes hash values corresponding to regions of the SST file. To synchronize, the fingerprint files of two SST files are compared, and if any hash values are missing from a fingerprint file then the key-value-timestamp triples corresponding to these missing hash values are sent to the SST file that is missing them in the SST file is compacted with the missing triples to create a new version of the SST file. The other fingerprint file is then analyzed the same way.

20 Claims, 10 Drawing Sheets

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,649,276 B2 * | 2/2014 | O'Shea ............... H04L 1/1614 370/252 |
| 8,954,446 B2 | 2/2015 | Vijayan Retnamma et al. |
| 9,020,900 B2 | 4/2015 | Vijayan Retnamma et al. |
| 9,098,495 B2 | 8/2015 | Gokhale |
| 9,239,687 B2 | 1/2016 | Vijayan et al. |
| 9,242,151 B2 | 1/2016 | Murphy |
| 9,411,534 B2 | 8/2016 | Lakshman et al. |
| 9,483,205 B2 | 11/2016 | Lakshman et al. |
| 9,558,085 B2 | 1/2017 | Lakshman |
| 9,633,033 B2 | 4/2017 | Vijayan et al. |
| 9,639,274 B2 | 5/2017 | Maranna et al. |
| 9,798,489 B2 | 10/2017 | Lakshman et al. |
| 9,864,530 B2 | 1/2018 | Lakshman |
| 9,875,063 B2 | 1/2018 | Lakshman |
| 10,067,722 B2 | 9/2018 | Lakshman |
| 10,248,174 B2 | 4/2019 | Lakshman et al. |
| 2005/0044356 A1 * | 2/2005 | Srivastava ............ H04L 9/0827 713/163 |
| 2006/0224846 A1 | 10/2006 | Amarendran et al. |
| 2009/0319534 A1 | 12/2009 | Gokhale |
| 2012/0150818 A1 | 6/2012 | Vijayan Retnamma et al. |
| 2012/0150826 A1 | 6/2012 | Vijayan Retnamma et al. |
| 2014/0201137 A1 | 7/2014 | Vibhor et al. |
| 2014/0201140 A1 | 7/2014 | Vibhor et al. |
| 2014/0201141 A1 | 7/2014 | Vibhor et al. |
| 2014/0201144 A1 | 7/2014 | Vibhor et al. |
| 2014/0201170 A1 | 7/2014 | Vijayan et al. |
| 2014/0337285 A1 | 11/2014 | Gokhale et al. |
| 2015/0154220 A1 | 6/2015 | Ngo et al. |
| 2016/0142249 A1 * | 5/2016 | Wu .................... H04L 41/0806 709/222 |
| 2016/0162370 A1 | 6/2016 | Mehta et al. |
| 2016/0210195 A1 | 7/2016 | Sinha |
| 2016/0350302 A1 | 12/2016 | Lakshman |
| 2016/0350391 A1 | 12/2016 | Vijayan et al. |
| 2017/0032012 A1 * | 2/2017 | Zhang ................. G06F 16/275 |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0235756 A1 | 8/2017 | Mehta et al. |
| 2017/0242871 A1 | 8/2017 | Kilaru et al. |
| 2017/0329527 A1 | 11/2017 | Lakshman et al. |
| 2017/0329530 A1 | 11/2017 | Lakshman et al. |
| 2018/0284986 A1 | 10/2018 | Bhagi et al. |
| 2018/0285201 A1 | 10/2018 | Bangalore et al. |
| 2018/0285382 A1 | 10/2018 | Mehta et al. |
| 2018/0314726 A1 * | 11/2018 | Bath ................... G06F 16/2365 |
| 2019/0171264 A1 | 6/2019 | Lakshman et al. |
| 2019/0266054 A1 | 8/2019 | Kumarasamy et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

(56) References Cited

OTHER PUBLICATIONS

Rosenblum et al., "The Design and Implementation of a Log-Structure File System," Operating Systems Review SIGOPS, vol. 25, No. 5, May 1991, New York, US, pp. 1-15.

\* cited by examiner

Formation of SLH Triples from an SST

Minor Compaction

SYNCHRONIZATION OF METADATA IN A DISTRIBUTED STORAGE SYSTEM

CROSS-REFERENCE TO RELATED APPLICATIONS

This application is related to U.S. patent application Ser. Nos. 14/322,813, 14/322,832, 14/684,086, 14/322,850, 14/322,855, 14/322,867, 14/322,868, 14/322,871, and 14/723,380, which are all hereby incorporated by reference.

FIELD OF THE INVENTION

The present invention relates generally to synchronization of metadata used to store data. More specifically, the present invention relates to compaction and synchronization of metadata for faster access within a data center.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

Currently, enterprises typically use a remote data center or data centers, each hosting a storage platform on which to store the data, files, etc., of the enterprise. A computer server of an enterprise may now host many different server applications, each application needing to store its data to the data center or centers. Accompanying this huge amount of data is the metadata that helps to describe the data including the location of the data, replication information, version numbers, etc. Because of the quantity of metadata, the techniques used to store it, and the need to access the metadata, numerous problems have arisen.

For example, because the metadata for a particular write operation or for a particular block of data may be stored on two or more metadata nodes, it is important that this metadata be synchronized between nodes, i.e., the metadata for a particular write should be the same on each metadata node. Various events can affect synchronization: a time delay between the storage of metadata on nodes or between data centers in a distributed storage system can allow an application to inadvertently read old metadata; a metadata node failure either means that metadata may not be read from that node or that the node will contain stale metadata when it comes back online; a disk failure of a metadata node also prevents reading of the correct metadata; a data center failure prevents reading of metadata from that center or means that a strong read of metadata cannot be performed; and, metadata may become corrupted in other manners.

Synchronization should be performed quickly but many prior art techniques do not perform synchronization fast enough or are disadvantageous for other reasons. By way of example, the Dynamo database used by Amazon, Inc. uses a Merkle Tree to identify differences between two metadata sources. A Merkle Tree is built by hashing pieces of input metadata, then hashing the resulting hashes into higher-level hashes and so on recursively, until a single hash is generated—the root of the Merkle Tree. Maintaining such a structure requires more meta-metadata and keeping it updated as metadata modified is computationally intensive.

The Rsync tool is used to synchronize files between two servers. It uses less metadata than a Merkle Tree-based approach, but, because it is oblivious to the data that it is synchronizing, it cannot be used in a bidirectional manner. In other words, it cannot be used to merge changes introduced at the two ends of the synchronization. The Rsync tool requires one of the servers to have the final version of the file which is to be copied to the other server. The technique known as Remote Differential Compression (RDC) available from Microsoft Corporation minimizes the copying of data by using data not in the file being synchronized but already present at the destination. As in the Rsync tool, however, RDC synchronization is unidirectional.

Accordingly, a synchronization technique for metadata is desirable that is faster, uses less meta-metadata, less storage, less bandwidth and allows for bidirectional synchronization.

SUMMARY OF THE INVENTION

To achieve the foregoing, and in accordance with the purpose of the present invention, a metadata synchronization technique is provided that includes the advantages discussed below.

The disclosed metadata synchronization technique provides for faster synchronization between metadata nodes thus improving the reliability of weak reads (reading metadata from only a single metadata node). The technique also synchronizes between metadata stored in files, providing for finer granularity, uses less meta-metadata to perform the synchronization, less storage and less bandwidth. The invention compares replicas of metadata and ensures that the replicas agree on a superset of the metadata contained therein without losing any metadata.

Unlike the prior art Dynamo database that uses meta-metadata just in order to synchronize the regular metadata for all levels of the Merkle Tree, the present invention only uses meta-metadata in what would be the first level of a Merkle Tree, therefore using a much smaller quantity of meta-metadata.

During storage and compaction of string-sorted tables (SSTs), a consistent file identification scheme is used across all metadata nodes. A fingerprint file is created for each SST that includes a start-length-hash value triple for each region of the SST. Replicas of SSTs are compared and synchronized by comparing their fingerprint files resulting in a faster and more efficient synchronization process.

In a first embodiment, metadata is synchronized between two metadata files using a fingerprint file for each metadata file. Any missing metadata is sent to the file missing the metadata.

In a second embodiment, metadata is stored on a computer node into a table on disk. The table is compacted with other tables on disk. A fingerprint value is calculated for the table and stored in the data storage platform.

In a third embodiment, metadata from a mutation is stored onto two metadata nodes and is flushed into tables. The tables are compared using their respective fingerprint files and missing metadata from one table is sent to the other table for compaction.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
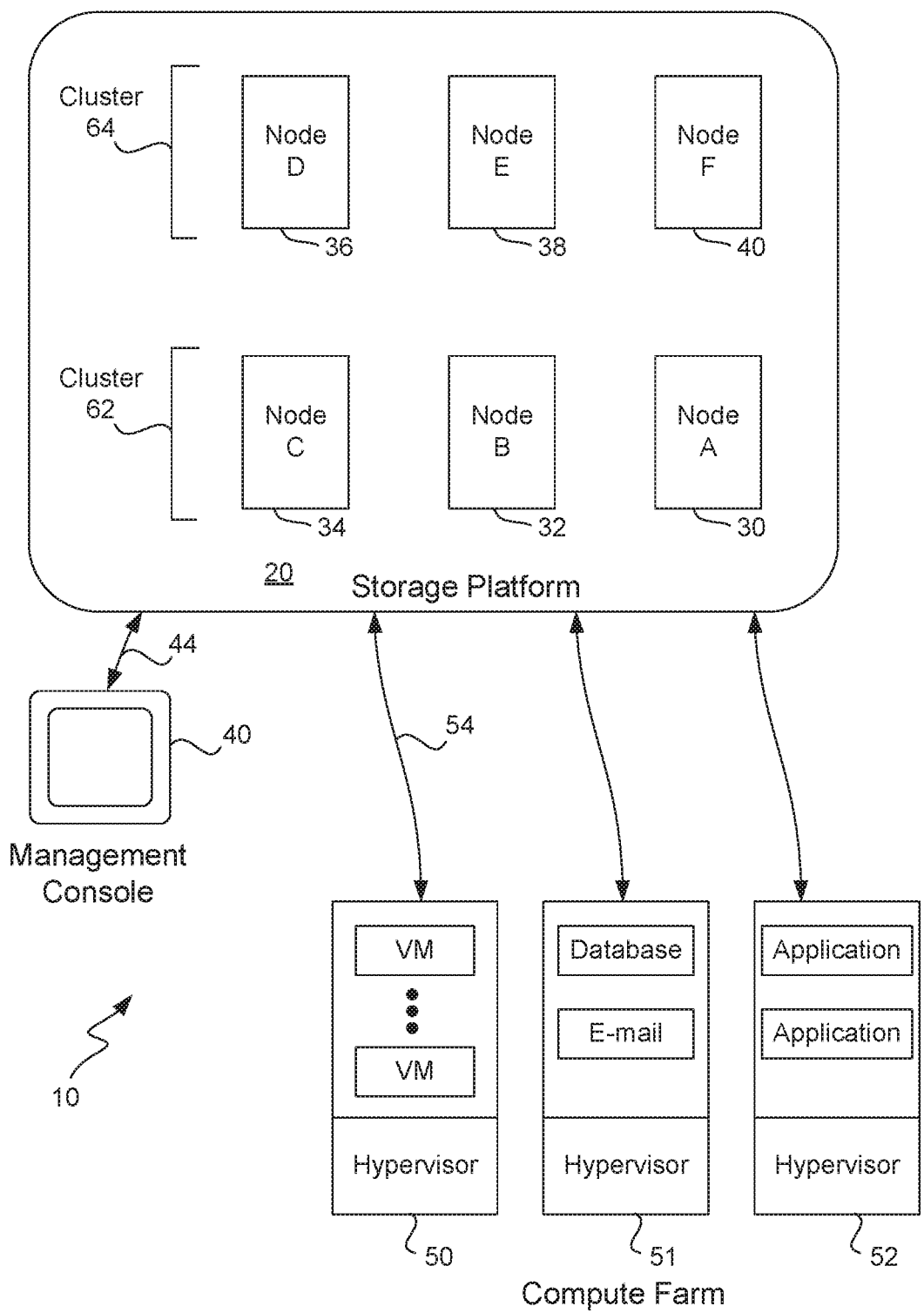
FIG. 1 illustrates a data storage system according to one embodiment of the invention having a storage platform.

FIG. 1 illustrates a data storage system 10 that may be used in one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely-located computer servers 50-52 each typically executes a hypervisor in order to host any number of virtual machines. Server computers 50-52 form what is typically referred to as a compute farm. As shown, these virtual machines may be implementing any of a variety of applications such as a database server, an e-mail server, etc., including applications from companies such as Oracle, Microsoft, etc. These applications write to and read data from the storage platform using a suitable storage protocol such as iSCSI or NFS, although each application may not be aware that data is being transferred over link 54 using a proprietary protocol.

Management console 40 is any suitable computer able to communicate over an Internet connection 44 with storage platform 20. When an administrator wishes to manage the storage platform (e.g., provisioning a virtual disk, snapshots, revert, clone, analyze metrics, determine health of cluster, etc.) he or she uses the management console to access the storage platform and is put in communication with a management console routine executing as part of metadata module 130 on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy and other policies concerning whether or not to compress the data, the type of disk storage, etc. Once the virtual disk has been created, it is then attached to a particular virtual machine within one of the computer servers 50-52 and the provisioning process is complete.

As mentioned above, each computer server may host any number of virtual machines, each executing a particular software application. Each virtual machine (or more specifically, the application executing on the virtual machine) is able to communicate with the storage platform using any of a variety of protocols. Each server 51 may also include a specialized controller virtual machine (CVM) that is specially adapted to handle communications with the virtual machines and communicates with the storage platform. The CVM also uses a memory cache on the computer server 51. In communication with computer 51 and with the CVM are any number of solid-state disks (or other similar memory).

Preferably, all information concerning a particular virtual disk attached to a CVM is organized into a virtual disk object and then stored into the memory cache of the CVM. A hash table is used to store these virtual disk objects and the key to find each object is the name of the virtual disk. Stored within this cache is the generation number, virtual disk information and the metadata nodes indicating on which nodes the metadata for this virtual disk is stored.

Figure 2:
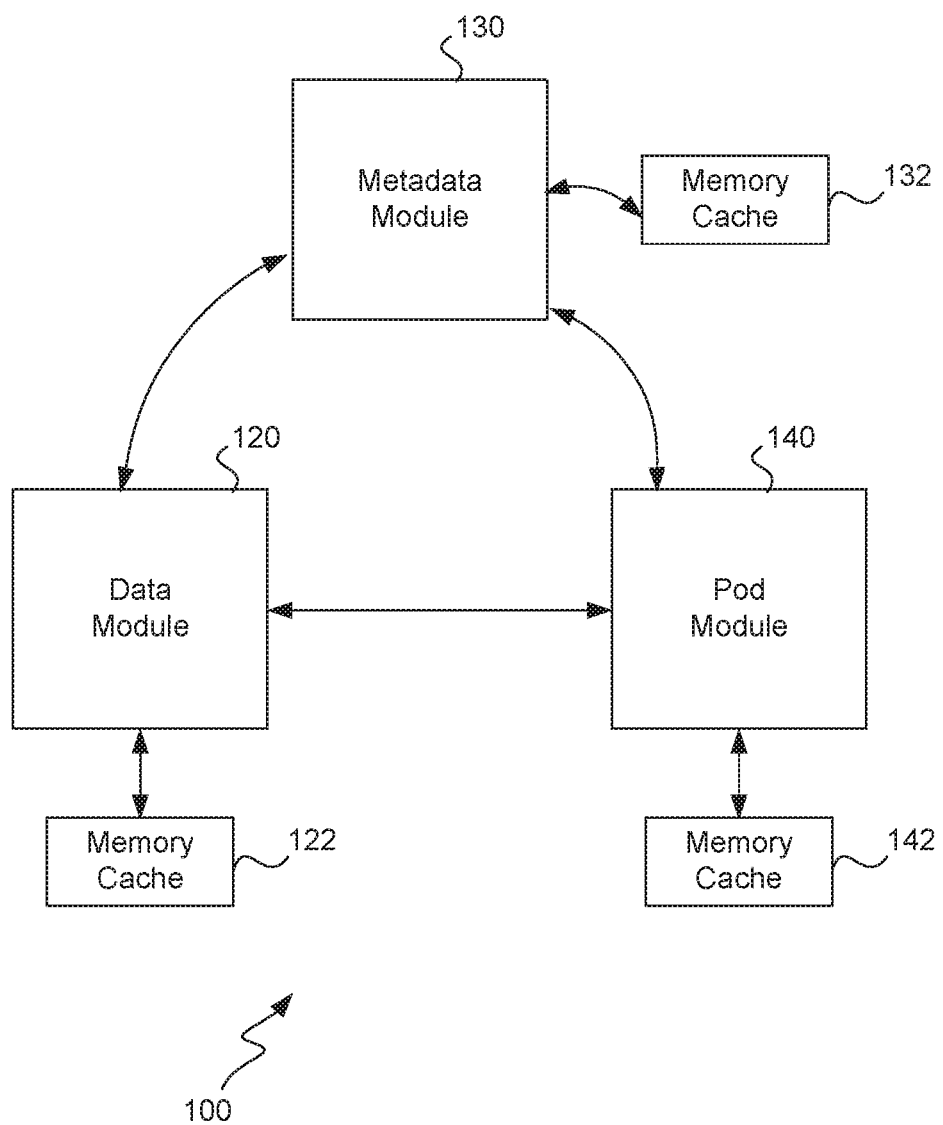
FIG. 2 illustrates software modules used within the storage system.

FIG. 2 illustrates software modules used within storage system 10. Preferably, as shown, each node of the storage platform includes a data module 120, a metadata module 130 and a pod module 140. Data module handles the storage of data (such as blocks of data, files, objects, etc.) onto individual computer nodes 30-40. Metadata module handles the storage of metadata within the platform, that is, data that helps describe the data. Pod module is a coordinator module and also stores transaction states. Each node of the platform may store data, metadata or both.

Although shown as three modules, each of the modules runs independently on each of the computer nodes within the platform 20. Also, associated with each module on each node is a memory cache 122, 132 and 142 that stores information used by that module; each module on each computer node may also use persistent storage on that node. A file (for example) may be stored on nodes 32, 34 and 36 (so-called data nodes), and the metadata for that file may be stored on three different nodes; nodes for a file that store metadata are referred to as "metadata nodes." The data nodes and metadata nodes for a particular stored file may be the same or may be different. The modules communicate with each other via a modified version of Gossip over TCP, and work in concert to manage the storage platform.

Metadata

A wide variety of types of metadata may exist within storage system 10 or within any other type of storage system. The metadata module on each computer node handles the storage of this metadata by placing it into persistent storage. In one embodiment, a hash function is used upon the virtual disk name in order to produce a hash value which is then used to select three metadata nodes within the platform for that virtual disk. For example, metadata for a block of data may be stored upon nodes 36, 30 and 40 within the platform (which might be different from the nodes where the actual block data of the virtual disk has been be stored).

Typically, metadata is generated during and after a write operation and pertains to a particular block of data that has been stored. Each item of metadata includes a key-value-timestamp triplet, the key being a string, the value being a number of bytes, and the timestamp being the physical or logical time when the write occurred. The metadata that may be synchronized by the present invention encompasses many types and includes: mutation information after write requests (where data blocks were written, success and failure, virtual disk name, etc.); statistical information (metrics concerning the storage space being used) and any kind of information needed to keep the health and operational efficiency of the system. Mutation metadata is discussed in more detail below.

As mentioned earlier, while the data associated with a particular write request may end up on three different data nodes, the metadata associated with that write request will be stored using the metadata modules 130 on the computer nodes, and these metadata nodes may be different from the nodes used for data storage.

Figure 3:
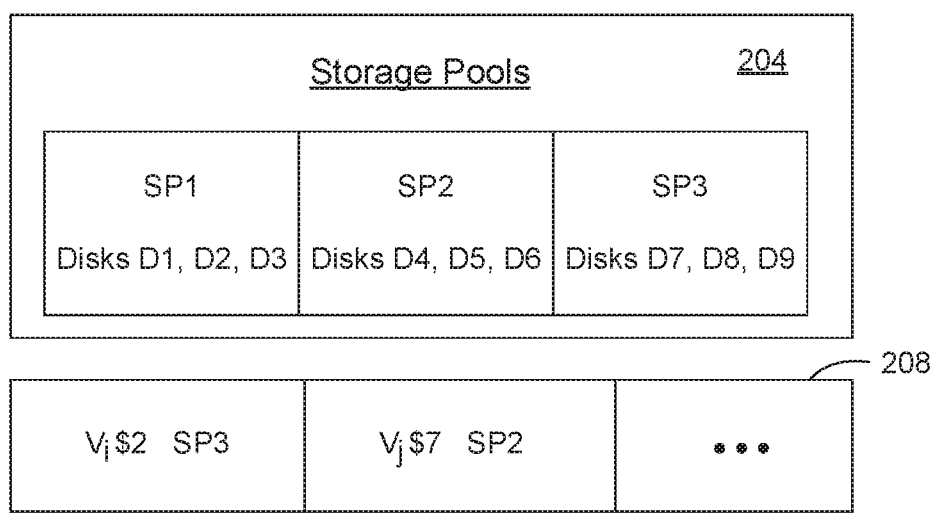
FIG. 3 illustrates the persistent storage used by a metadata module executing upon a computer node A within the platform.

FIG. 3 illustrates the persistent storage used by a metadata module 130 executing upon a particular computer node A within the platform. As mentioned before, each computer node includes an executing metadata module each storing metadata concerning nodes, virtual disks, write operations, etc. Persistent storage 204 includes storage pools, each pool having a unique identifier (e.g., "SP1") as well as the unique identifiers for each disk (e.g., "D1"), and in which storage pool each disk belongs. Container information 208 also shows which containers are stored within each storage pool. Using a naming convention for containers, this shows that container "ViS2" (associated with virtual disk "Vi") is located on node A and that it is part of storage pool SP3. The second listed container is shown as being part of the storage pool SP2. Of course, other types of persistent storage and methods for using it are also contemplated.

Figure 4:
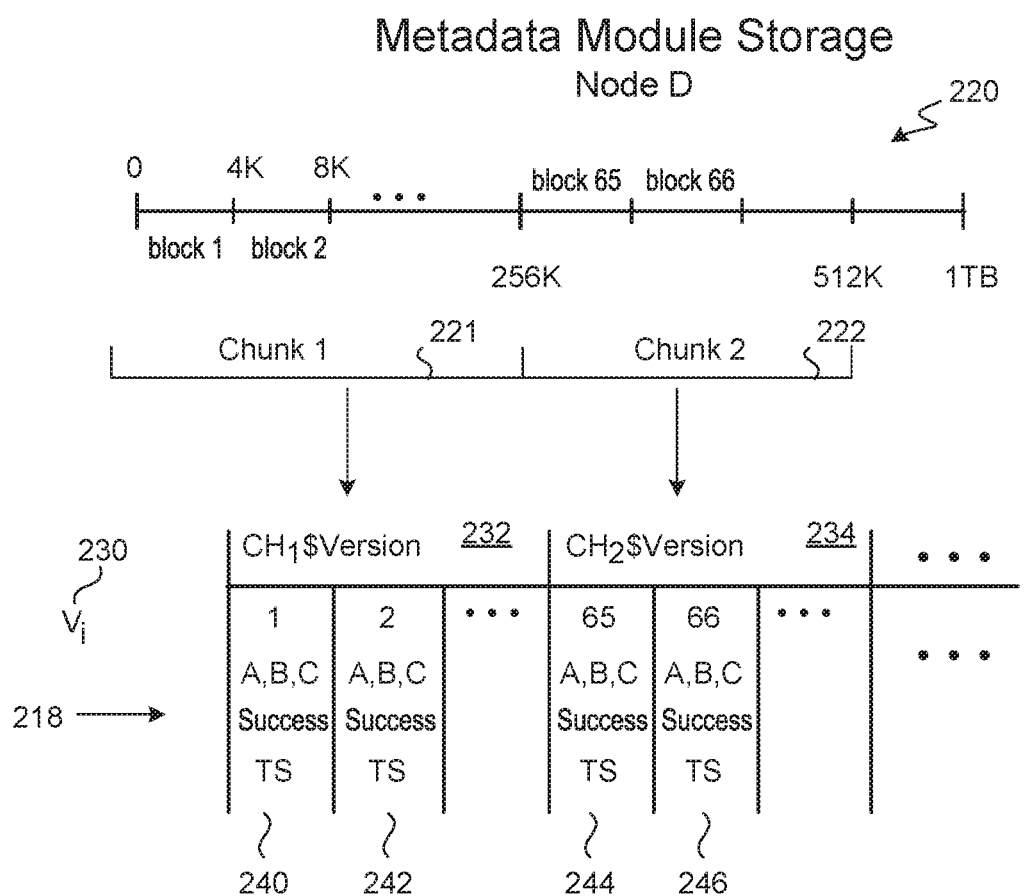
FIG. 4 illustrates one type of metadata stored by a metadata module.

FIG. 4 illustrates one type of metadata stored by a metadata module. Shown, for example, is persistent storage 218 on node D with information that has been stored by its metadata module. Shown symbolically (not to scale) at 220 is a virtual disk in which data has been written into blocks 1-66. In this example, assume that the virtual disk has a size of 1 TB, that each chunk portion has a size of 256 kB, assume that each block has a size of 4 kB, and that 66 blocks have been written into this virtual disk. Chunks 221 and 222 illustrate that metadata is stored on a per chunk basis, each chunk metadata 232, 234, etc., including in its name the version number which identifies the version of the data stored. For example, the name "CH1$Version" includes the variable "Version" which is a version number.

For a particular virtual disk "Vi" 230 (metadata for other virtual disks may also be stored on this metadata node), write information is stored symbolically in columns 232, 234, etc., each column corresponding to a particular chunk of the virtual disk. In one embodiment, there will be a new column for a given chunk if the version is incremented and one writes again into the first chunk. In this fashion, older versions of data are never overwritten or lost, they are all saved within the storage platform for later reference if necessary.

Within a chunk column 232 are individual block columns 240, 242, etc., including the metadata for the individual blocks of that chunk that have been written to the virtual disk. For example, column 240 includes the block number "1," the computer nodes (A, B, C) to which that block was written, whether or not the write was a success, and a timestamp. Column 242 includes similar metadata for the second block. Within column 232 there will be 64 individual block columns due to the size of the blocks and the size of the chunks. Column 234 will also include the same number of block columns, for example, block column 246 identifies the block number "66," and the metadata earlier described. In this fashion, the metadata for particular virtual disk 230 is stored upon one of the computer nodes using its metadata module, and includes an identification of where each of its blocks are stored, a version, a timestamp, etc.

Write to Virtual Disk

Figure 5:
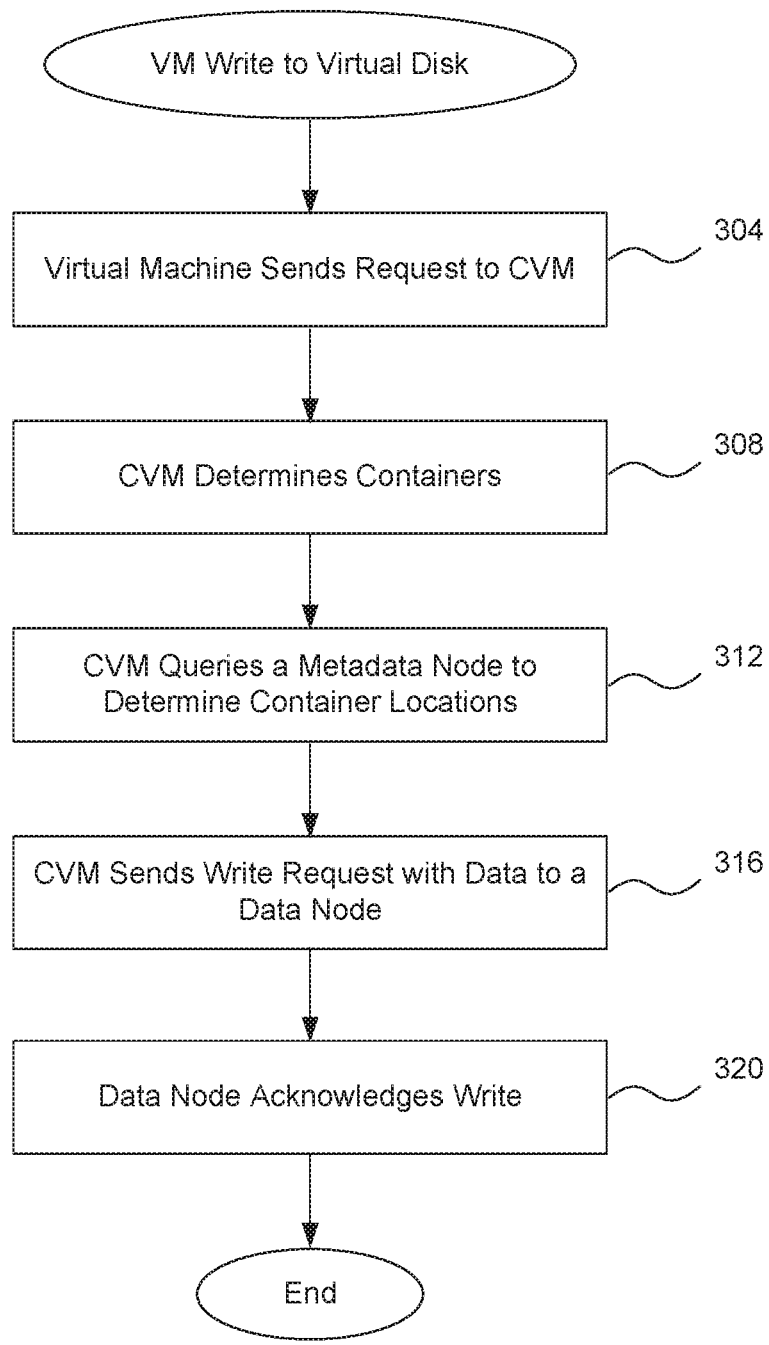
FIG. 5 is a flow diagram describing one embodiment by which a virtual machine writes data to the storage platform.

FIG. 5 is a flow diagram describing one embodiment by which a virtual machine writes data to the storage platform. A write operation will produce metadata as is discussed above and below.

In step 304 the virtual machine that desires to write data into the storage platform sends a write request including the data to be written to a particular virtual disk (supplied to the application by the administrator earlier) via the CVM. As mentioned, a write request may originate with any of the virtual machines on one of computers 50-52 and may use any of a variety of storage protocols. The write request typically takes the form: write (offset, size, virtual disk name) The parameter "virtual disk name" is the name of the virtual disk originally selected during provisioning. The parameter "offset" is an offset within the virtual disk (i.e., a value from 0 up to the size of the virtual disk), and the parameter "size" is the size of the data to be written in bytes.

Next, in step 308 the controller virtual machine determines which containers to use for this request based upon the offset and size parameters. In step 312 the CVM queries a metadata node to determine on which computer nodes the container should be stored. Because the particular metadata nodes on which the metadata for the virtual disk is stored had been previously cached by the CVM, the CVM can easily select one of these metadata nodes to query.

In step 316 the CVM then sends the write request (in this case, simply the data itself to be written) to one of the data nodes returned in the previous step (e.g., data node E). The write request also includes an indication of the other two data nodes (B, D) to which the data should be written. The data node that receives the request then writes the data to its disk drives and then forwards the data to the other two nodes. Once each of these nodes writes the data to its disk drives, each of these nodes returns an acknowledgment back to the first data node that had originally received the request from the CVM. A timestamp is also sent with the write request.

In step 320 this first data node (e.g., E) acknowledges that the write has occurred to the CVM and returns the names of the data nodes (e.g., B, D and E) where the data was written. Preferably, write operations do not overwrite older versions of data. In this fashion, earlier versions of data in a virtual disk are available to be read.

Store Metadata

Figure 6:
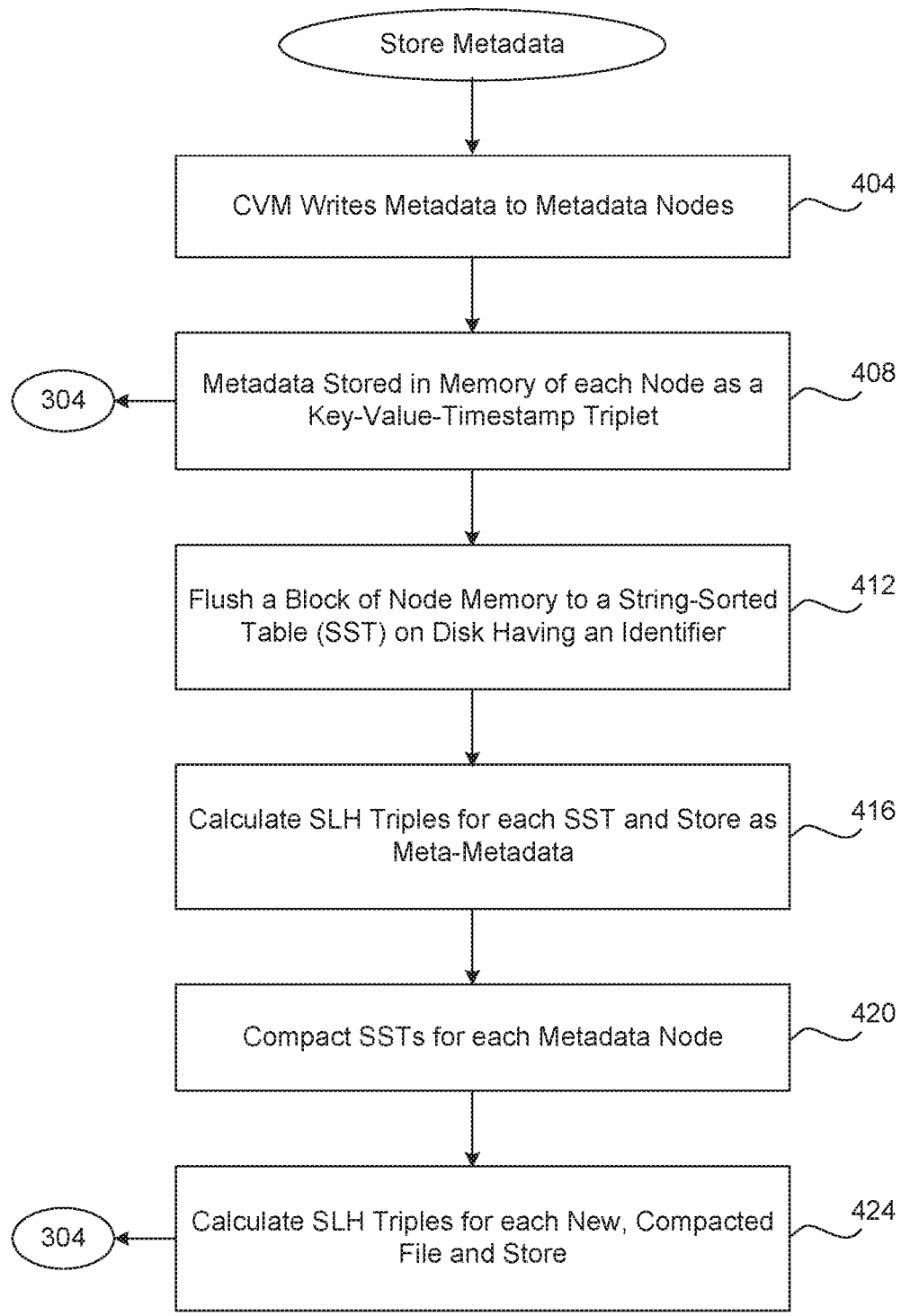
FIG. 6 is a flow diagram describing one embodiment by which metadata is stored to metadata nodes within the storage platform after a write operation.

FIG. 6 is a flow diagram describing one embodiment by which metadata is stored to metadata nodes within the storage platform after a write operation.

A computer node such as node "A" to which a block of data is written will have the metadata for that write operation stored on at least two metadata nodes within the platform, and preferably three. This metadata will be stored using the metadata module executing upon each node and stored within persistent storage associated with each metadata module. The metadata nodes to be used for a write operation on a particular data node may be determined (for example) by using a hash function on the unique identifier of a data node in order to produce a hash value. This hash value is then used to identify three computer nodes within the platform that will be the metadata nodes for that particular data. Other techniques may also be used to identify metadata nodes to be used after a write operation. Determining which are the metadata nodes to be used to write the metadata after a write operation may be performed in different manners. These metadata nodes may depend upon the name of the virtual disk, the data nodes, data offset, type of metadata, or upon some other factor, as long as the process is deterministic.

Typically, the flow diagram of FIG. 6 occurs in a background process after the flow diagram of FIG. 5, i.e., after the CVM has performed a write operation to a data node on behalf of a client application. Although metadata storage and synchronization may be performed after other types of operations, it makes most sense after a write operation, including any operation that changes, deletes or otherwise modifies a block or blocks of data.

Various types of metadata may be generated during a write operation. One type, for example, keeps track of which blocks were written to a particular virtual disk and a container, and to which data nodes, as well as a timestamp for the write operation. This metadata may be captured by a table for each container of the virtual disk where columns represent block numbers, a first row includes cells having a timestamp (or no value if a write to a particular data node failed), and a second row includes cells having the identifier of the data node to which the block was written. Another type of metadata keeps track of failed writes, i.e., which blocks were not written to particular data nodes when they should have been written. This type may also be represented in the table mentioned above. A third type of metadata (actually, meta-metadata) is generated in step 416 as described below. Preferably, a different merge tree will be used for each type of metadata as will be explained in more detail below.

In one particular embodiment to generate the first type of metadata, the CVM calculates the block identifiers (i.e., blocks 1, 2, 3) within the virtual disk where the data has been stored and then sends this information to the metadata nodes. As is known in the art, disks are typically divided up into blocks (usually blocks of 4K) and data is written to, and read from, disks using blocks. Because the CVM is aware of the offset for the write request, the CVM then knows the block identifier for the first block to be written for the current write request. And, because the size of the write request is also known, the CVM is then able to easily calculate onto which data nodes blocks of data were written, and the corresponding block identifiers for those blocks of data. In the current example, the CVM calculates the block identifiers for those blocks of data in the current write request which were written to nodes B, D and E. Even if a write request spans two different containers, by simple calculation using the container size, offset, and size of the write request, the CVM will be able to determine which block identifiers were written to the first container and which block identifiers were written to the second container.

In step 404 the CVM sends metadata (e.g., key-value-timestamp triplets) from the previous write operation to the designated metadata nodes for the current virtual disk.

Next, in step 408 each metadata node stores in its memory the key-value-timestamp triples received from the CVM. Metadata is stored in memory blocks and each node allocates any number of memory blocks in memory to store this metadata and the blocks in memory may be filled consecutively as the triplets arrive or they may be filled in parallel. Each type of metadata will be stored in its own set of memory blocks.

Memory blocks are tagged with increasing unique numerical identifiers, starting from 0, for example. Preferably, memory block identifiers, which will later serve as SST and file identifiers, are generated locally, and not by the CVM. Under ideal conditions, metadata would reach metadata nodes in the same order and be stored to blocks having the same identifier, but asynchronism and failures can prevent such behavior. Differences are minimized by piggybacking current identifiers in intra metadata node communication and by increasing local identifiers to match those from other nodes whenever possible. As a result, blocks with a given identifier may be missing from any given node and blocks with the same identifiers in different nodes may not contain the same metadata. These differences do not constitute an inconsistency in the metadata. If a new triplet corresponding to newer data is stored within a memory block that already contains a triplet having the same key, then the old triplet is overwritten.

As applications write data to virtual disks (or as other processes of an enterprise or processes internal to the storage platform write data) metadata will continue to be stored on the metadata nodes in accordance with FIG. 5 and steps 404 and 408, as shown by the branch to step 304 from step 408. Thus, the process of writing data and storing metadata is a continuous process within platform 20.

At some point in time, in step 412 a metadata node will find it necessary (or desirable) to flush one of its blocks of memory (where the metadata triples have been stored) to a string-sorted table (SST) on disk. Again, each type of metadata will have its own set of blocks in memory and these sets of blocks will be flushed to a corresponding set of SSTs on disk corresponding to each type of metadata.

Figure 7:
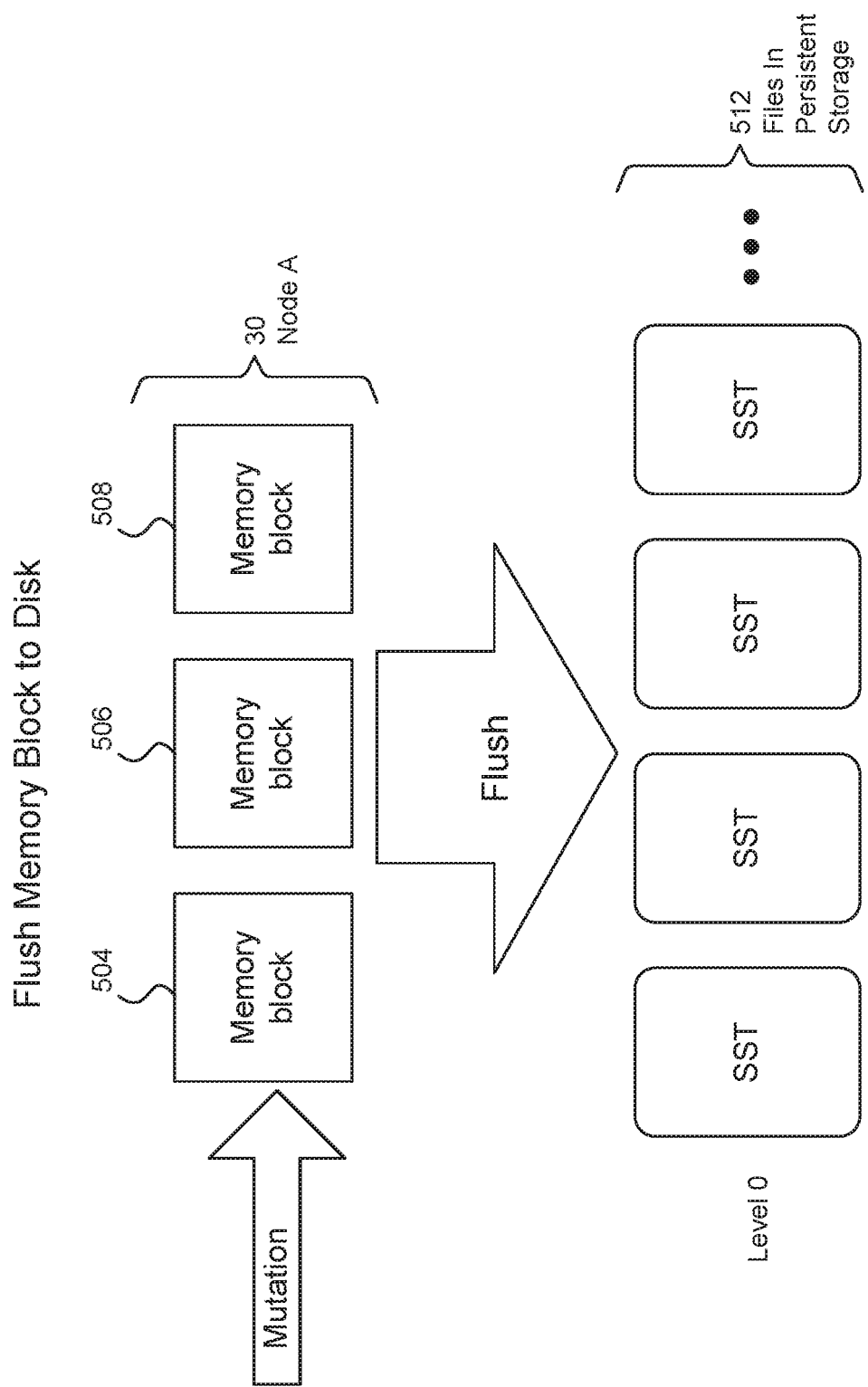
FIG. 7 is a block diagram illustrating symbolically the flushing of memory blocks of a metadata node to files on its disk.

FIG. 7 is a block diagram illustrating symbolically the flushing of memory blocks of a metadata node to SSTs on its disk. Shown is an example metadata node 30, node A, in which its memory includes memory blocks 504-508. When a mutation occurs (e.g., a write occurs to any of the data nodes within the storage system), a metadata triplet or triplets is written to one of the memory blocks. Periodically, when full, one of the memory blocks is flushed to a string-sorted table (SST) 512 in persistent storage of node A. Shown are only four such tables stored as files on disk (having SST identifiers 0-3), although any number of tables may be stored on disk as the memory is flushed. FIG. 7 represents the flushing of memory blocks to files on disk for one particular type of metadata; each type of metadata will be flushed to its own set of files on disk. Memory blocks, when flushed, are stored in Level 0 files as shown and will be explained in greater detail below.

As mentioned, an SST may be stored as a file on a hard disk that contains a sequence of metadata triplets sorted by key. An SST stored on disk will have the SST identifier equal to the memory block that held its data before the flush. Memory blocks may be flushed to disk consecutively as they fill, or, blocks may be filled in memory in parallel and may be flushed when they become full. The loop symbol on step 412 indicates that this step occurs continuously as the memory blocks in the memory of the metadata node become full. Typically, the SST identifiers of SSTs continually increase, even if the metadata node restarts, and are not reset back to "0." The metadata is kept sorted in memory of a node and the sorted metadata is sequentially flushed to disk.

When memory blocks are flushed to disk when full, it is possible that metadata from a particular write operation stored in an SST as a replica on one metadata node may not correspond exactly to another replica on a different metadata node. That is one of the reasons for synchronizing. One technique used to address this non-correspondence is the following. During the process of writing metadata, metadata nodes communicate with each other and embedded in this communication is the information about which memory block identifiers they are using. Thus, if metadata for a particular write operation is being written to a memory block X at node A, that same metadata may be written to a memory block Y at node B, but during such a write, A and B learn about each others' memory block usage and one node may skip some identifiers in order to catch up with the other node. For example, if metadata node A is writing to memory block 1, yet metadata node B is writing the same metadata to memory block 3, then node A may skip and write to block 3 instead of to block 1. This is especially important when a node comes online after being down for a long time. This skipping of identifiers will cause gaps in memory block numbering, which will be reflected in the SSTs, since they carry the same identifier as the memory block they originated from. Having gaps in the SST identifiers implies that the merge tree (discussed later) will be missing some leaves, but because the compaction is deterministic regarding the files that must be compacted together, this compaction is not affected by the gaps.

As each memory block is flushed to an SST on disk, in step 416 a unique fingerprint is calculated for each SST and this meta-metadata is stored in persistent storage of any node of the storage platform where it can be accessed by any of the metadata modules 130 of the storage platform. In one embodiment, a rolling hash (such as Rabin's Hashing by Polynomials) is used to establish a series of boundaries throughout each SST, thus creating any number of regions of the SST (each region being bounded by two consecutive boundaries).

Figure 8:
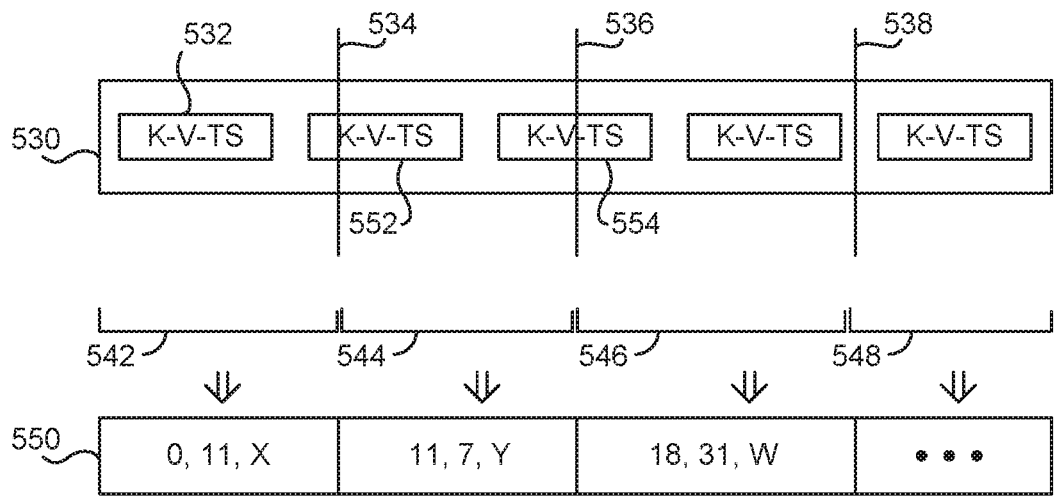
FIG. 8 illustrates an example of how a fingerprint is calculated for an SST file.

FIG. 8 illustrates an example of how a fingerprint is calculated for an SST. Shown is a string-sorted table (SST) 530 that contains any number of key-value-timestamp triples 532. Boundaries 534-538 have been established throughout the SST (the beginning of the SST and the end of the SST each also being a boundary) using, for example, a rolling hash technique. These boundaries thus define regions 542-548, each region including a start byte location within the SST, a length in bytes and a hash value for the contents of that region, e.g., region 542 is defined by the SLH triple "0, 11, X", the start location being "0," the length being "11" and the hash value being "X."

For each of these regions 542-548 of the SST, a hash value is calculated (using any suitable hashing technique) based upon the contents of each region, and the resulting hash value is combined with the start location of that region and length of that region to create a start-length-hash value triple (SLH triple) for each region. The resulting fingerprint of each SST is then a set of all of these SLH triples. A consecutive list of these SLH triples for the SST file 530 is then placed into a fingerprint file 550. This resulting meta-metadata (file 550 of SLH triples) may be processed and stored as metadata according to steps 408, 412 and 420, except that step 416 will not be performed upon this meta-metadata. Of course, other techniques may also be used to process and store this meta-metadata. Also, a fingerprint may be calculated for an SST by hashing slices of a predetermined size of the SST. This approach, however, is prone to small changes in input leading to great changes in the fingerprint, which may lead to a synchronization mechanism that assumes the SSTs to be more different than they actually are.

Next, in step 420, all of the SST's for each particular type of metadata are compacted on each metadata node. The files resulting from compaction are also stored in persistent storage on the applicable metadata node, e.g., in one of the storage pools 204. In this example, each SST is referred to as a file although other forms of storage are possible. Due to natural use of the storage system, metadata written earlier in the lifetime of the system may be superseded by metadata written later, that is, with same key but later timestamp. Compaction occurs by iterating through the keys of a group of files (in this case, four files at a time), and, if any keys are the same for any triples, deleting those triples having older timestamps so that only the newest triple for a particular key remains. Hence, the stale metadata does not move on to the resulting file, and as the input files are deleted, the system is freed of the useless information. Thus, four files are compacted into one file; of course, groups of three files, five files, or more, may be also be used.

Figure 9:
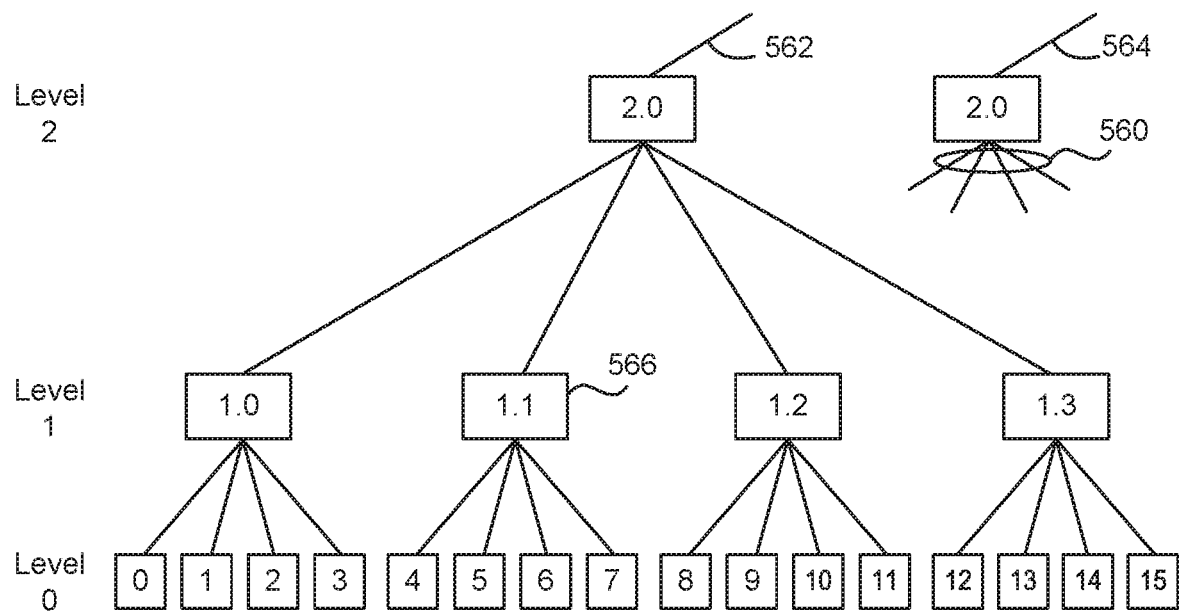
FIG. 9 shows the minor compaction that occurs in step 420.

FIG. 9 shows the minor compaction that occurs in step 420 to produce a merge tree. Again, this represents the compaction that occurs for one particular type of metadata; each type of metadata for a particular metadata node will have its own corresponding tree and compaction. Level 0 shows SST's having identifiers 0-15 that have been flushed to disk and that are stored as files in persistent storage. Once files 0-3 exist on disk they are compacted to produce the file 1.0. Similarly, once files 4-7 have been flushed to disk they are compacted to produce file 1.1, etc. Once the four files 1.0, 1.1, 1.2 and 1.3 exist at Level 1 they are compacted to produce file 2.0 at level 2. Although not shown, once files having identifiers 16-31 exist on disk they would be compacted to create Level 1 files 1.4, 1.5, 1.6 and 1.7. Level 2 file 2.1 would then be created 560 by compacting files 1.4, 1.5, 1.6 and 1.7. Similarly, Level 2 files 2.0, 2.1 and 2.2, 2.3 (not shown) would be compacted 562, 564 to create a Level 3 file 3.0. Once a set of files has been compacted into another file, the original files may be deleted. Note that the file identification scheme and compaction for each level is consistent and that this file identification scheme and compaction is used across all metadata nodes within the storage platform. Other file identification schemes may also be used as long as they are consistent. For example, files may be compacted two-by-two at Level 0, but four-by-four at Level 1, eight-by-eight at Level 2, and so on.

Preferably, a file identification scheme has certain characteristics, for example, the scheme is consistent and the file identifiers are strictly increasing so that the compaction tree only grows to the right and upwards. Although it may not be known for a certainty that all files having the same identifier (file 1.1, for example, across metadata nodes) will contain the same metadata, there is a high chance of that being the case. Synchronization of two files will thus make them converge to the union of their contents.

Finally, in step 424 a unique fingerprint is calculated for each newly compacted file (files in Level 1 and above) as has been described in step 416. The list of SLH triples for each of these files is then stored as meta-metadata as has been described above. As this is a continuous process, a branch is shown to step 304 as the storage platform may continuously be writing to any of the data nodes.

Steps 404-424 are continuous in that as writes continuously occur within the storage platform metadata is continuously generated, this metadata is stored in memory blocks of a metadata node, the memory blocks are flushed to SSTs on disk, these SST files are compacted and the resulting files are continuously stored on disk. Accordingly, the example compaction tree shown in FIG. 9 is continuously growing not only horizontally as more SSTs are written to disk, but also vertically as more files are compacted and as more levels are generated.

The above technique for storage of metadata is a modified version of a log-structured merge tree technique. The technique has been modified by the way in which the files are chosen to be compacted together. Our approach chooses files to compact (i.e., joins) files based on their unique identifier, in a deterministic way. Other approaches choose files based on their sizes, the range of keys they cover, or how "hot" those keys are. None of these approaches, however, is deterministic.

In this situation, deterministic means that when given multiple replicas and trying to compact sets of files with exactly the same names, even if having different contents, the resulting files will have exactly the same names. If one were to use attributes of the files other than their names, different replicas could choose differently the groups of files to compact.

Synchronize Metadata

Figure 10:
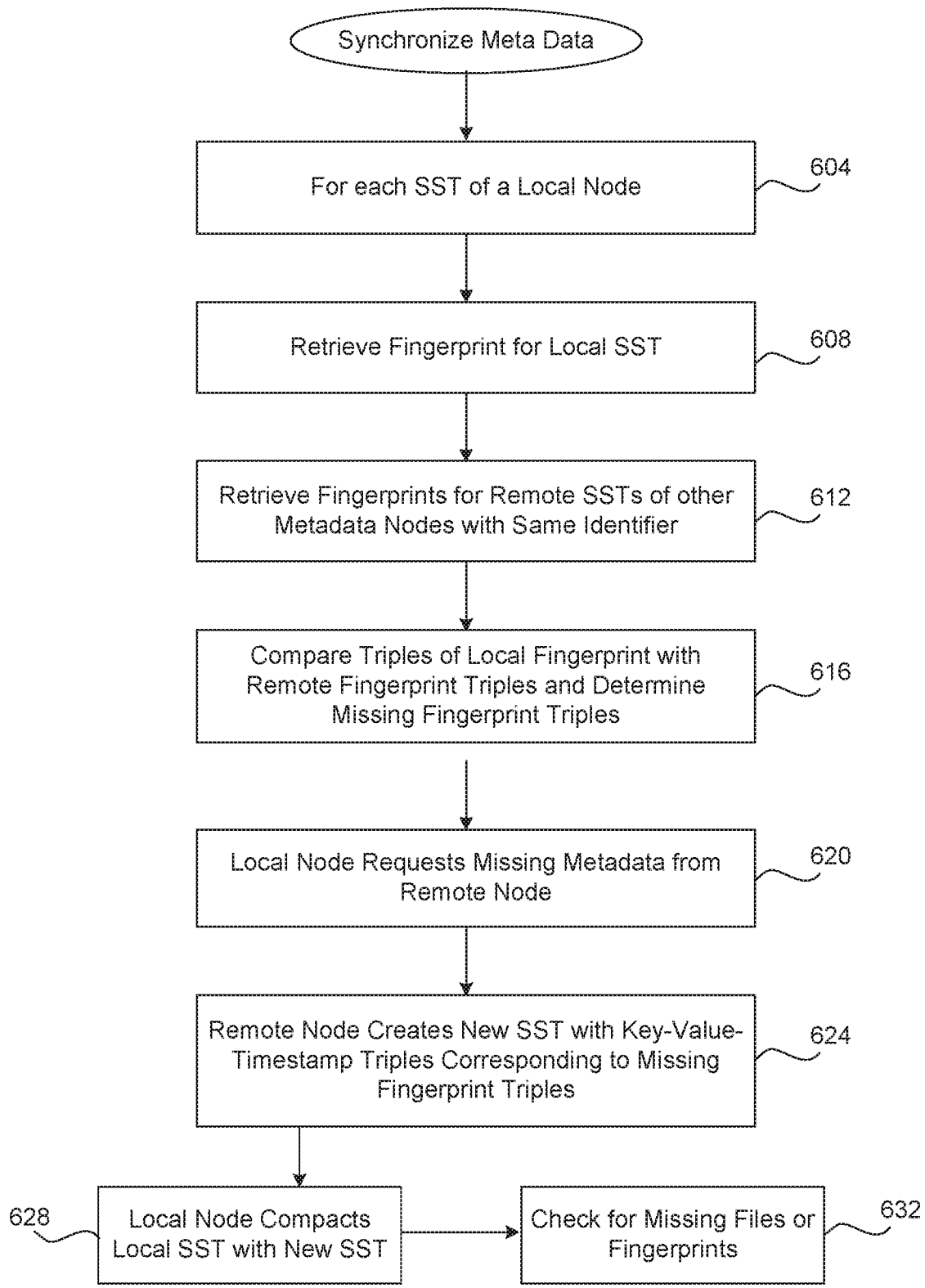
FIG. 10 is a flow diagram describing synchronizing of metadata within the storage platform.

FIG. 10 is a flow diagram describing how one type of metadata on a metadata node is synchronized with other replicas on other metadata nodes. As with the above process for storing metadata, the synchronization process is also continuous, in that each metadata node continuously executes the below process in order to synchronize the SST files that it holds. Again, various types of metadata may be stored and synchronized using the present invention; the below process is used to synchronize each type of metadata using the merge tree that has been created for each type of metadata on a metadata node. Because compaction does not happen immediately after a flush, even Level 0 files, which have not been compacted, may undergo synchronization. Files that have been compacted are deleted, and are not synchronized.

Beginning with step 604, each node within the storage platform that is a metadata node begins a process to iterate over each SST that it holds on disk that has not yet been synchronized. Various techniques may be used to indicate that an SST has already been or has recently been synchronized, such as by using flags, status tables, etc. Iteration over each SST may occur consecutively or in parallel. In this example, we assume that node C 34 is the metadata node that desires to synchronize its SSTs and that in this embodiment metadata is replicated on three different nodes within the storage platform. Of course, depending upon the implementation, metadata may be replicated on fewer nodes or greater nodes. Synchronization will be performed for all levels in the merge tree, including Level 0.

In step 608 the local fingerprint file created in step 416 or 424 for an SST of node C having a particular identifier (for example, file 1.1 566 in FIG. 9) is retrieved from its storage location. As mentioned earlier, the fingerprint files created in steps 416 of 424 may be stored on any node of the storage platform by way of a distributed hash table (for example). Retrieval of the fingerprint file for this SST would then use the same distributed hash table. Next, in step 612 the fingerprint files of the other two replica SSTs corresponding to SST 1.1 of node C (i.e., SSTs of other metadata nodes that have the same identifier) that had been stored on other metadata nodes (other than where the local fingerprint file is stored) within the storage platform are retrieved from their respective storage locations using, for example, the distributed hash table. There will be a total of three SSTs corresponding to a particular set of metadata because in this implementation the storage platform stores three replicas of all metadata. After step 612, the three fingerprints corresponding to these three SSTs have been retrieved and are ready to be compared against one another by node C.

It should be noted that, given a set of metadata nodes used to replicate some metadata, the type of metadata, and an SST identifier (such as 1.1), there can be only one corresponding SST in each of such nodes. For example, in one embodiment of the system, an SST named as "4ee5f0-a5caf0-dd59a2-VirtualDiskBlockInfo-7.sst" corresponds to the metadata maintained by nodes identified as 4ee5f0, a5caf0, and dd59a2 and of type "VirtualDiskBlockInfo." It is the eighth file of this kind, as denoted by the identifier "7." The combination of all of this information is unique per node and is repeated on only three nodes within the entire system. Thus, steps 608 and 612 are able to find the three SSTs that are replicas (theoretically) of one another. And, one finds which two fingerprints to compare out of the dozens of possible files each having the same identifier.

Next, in step 616 the triples of the local fingerprint file are compared against the triples of the remote fingerprint files, one file at a time. The SLH triples of the local fingerprint file are compared against the SLH triples of a remote fingerprint file in order to determine if the remote fingerprint file includes any SLH triples that the local file does not have. This comparison may be performed in a variety of manners; in one specific embodiment, the comparison determines whether the remote fingerprint file includes any triples having a hash value that is not present in any triple in the local fingerprint file. If so, these triples are identified as missing fingerprint triples. For example, referring to FIG. 8, assuming that 530 represents a remote SST, that file 550 is the fingerprint file for SST 530, and that the hash values for regions 542 and 544 (X and Y) are not present in any SLH triple in the local fingerprint file, then the first two SLH triples corresponding to regions 542 and 544 are identified as missing fingerprint triples. Missing SLH triples for regions 542 and 544 means that key-value-timestamp triples from ranges 542 and 544 are missing in the local SST.

Next, in step 620 the local node, node C, requests the metadata from the missing regions from the metadata node holding SST 530 corresponding to the fingerprint file 550 having the missing fingerprint triples. The request may be made in many ways, for example, the request may simply include a list of the entire missing SLH triples, a list of the hash values that are missing, a list of the regions corresponding to the missing triples, a list of boundaries defining the missing triples, etc. If fingerprint triples are missing from more than one fingerprint file, then steps 620-632 are performed for each fingerprint file.

In step 624 the remote node holding SST 530 receives the request from the local node and retrieves the SST that is the subject of the request. The remote node then prepares a response which will be a new SST that contains a sequence of the key-value-timestamp triples that correspond to the missing SLH triples identified in step 620. Continuing with the above example, if the missing SLH triples are those two that have the hash values "X" and "Y" in fingerprint file 550, it is determined that these missing triples correspond to regions 542 and 544. Next, for each region, any entire key-value-timestamp triple found within that region is placed into the new SST file, for region 542 this includes the triple 532. In addition, any triple partially found within a region will also be included. Thus, the triple 552 will be added to the new SST file because it is partially in region 542. Similarly, regarding region 544, both triples 552 and 554 will also be added to the new SST file because parts of these triples appear in region 544 which corresponds to the missing SLH triple "11, 7, Y." Note that it is possible (and is shown in this example) that a particular key-value-timestamp triple may be added to the new SST file twice (e.g., triple 552). Preferably, the remote node removes any such duplicates before it returns this new SST file to the requesting local node. Or, the remote node filters out any duplicate triples before the new SST is written locally on the remote node, before sending the new SST to the local node.

Next, in step 628, the local node compacts the local SST (the local SST which was chosen for iteration above in step 604) with the received new SST from the remote node to create a replacement SST. For example, if the file 1.1 566 is the subject of the synchronization of the steps of FIG. 10, and it is compacted with a new SST from a remote metadata node, then a new replacement SST file having the identifier "1.1" will be created.

As mentioned above, the process of steps 616-628 occurs for all replicas of the local SST. For example, if the storage platform stores three replicas of metadata, then steps 616-628 will occur once for each of the other two remaining replicas (assuming that there are missing fingerprint triples in each of the other two replicas). Once all replicas have been compared to the local SST then this local SST is marked as "Synchronized." After a period of time or if certain conditions occur, a metadata node may decide to perform another iteration of synchronization and on its SSTs. This synchronization may be periodic or may be instigated manually by the storage platform or by a particular metadata node.

Step 632 checks for missing SSTs or fingerprints. Because of the gaps in SST identifiers mentioned earlier, a local node A may not be able to retrieve the fingerprint from a remote node B, because node B does not have either the SST nor the fingerprint file. As a last step in the synchronization, A sends a list of files that it believes B is missing, to B. Upon receiving such a message, in a parallel flow, B will check if the missing files might still be created locally (for example by a flush that is yet to happen), or if the file existed before but has already been compacted. If none of these is the case and the file is indeed missing, node B requests all the regions of these missing files from node A. Node A then sends the SST which, upon being received by node B, will simply be incorporated as a regular SST.

In addition, the metadata nodes that hold the two replica SSTs will also perform the steps of FIG. 10 for each of these replica SSTs in order to synchronize each of these SSTs. Thus, key-value-timestamp triples that are missing in one of the remote replica SSTs can be provided by one of the other replicas. In this way, synchronization is bi-directional. Bi-directional means that if nodes A and B are synchronizing a certain file F, then any data in A's version of F that is missing from B's version will be copied to B and vice-versa. This ability to synchronize in a bi-directional manner is important because both A and B can have data that the other does not.

Synchronizing in a bi-directional manner is different from, say, a backup application, which is always updating the backup with data from the source, but, except for when recovering a backup, never updates the source with data from the backup.

Reading of Metadata

As mentioned above, the processes of FIG. 6 and FIG. 10 are processes that continuously store and synchronize metadata within the storage platform on the metadata nodes using a metadata module 130 of each metadata node. When a remote application or process internal to the storage platform needs to read metadata it reads the metadata from both the memory blocks in the memory of each metadata node and from the SSTs stored as files on disk of each metadata node.

In order for an application to identify from which SST it needs to read the metadata is uses an SST attribute. In other words, if an application knows that metadata for a particular virtual disk is on nodes A, B, C, it will be able to find the correct SST. Accordingly, each SST has an attribute specifying the smallest and largest key it contains. If a read is for a key that falls in such a range, then the SST will be read. The read is done efficiently by means of a companion index file for each SST. Other techniques may be used to choose more efficiently from which SST to read (for example, the use of a Bloom Filter).

Computer System Embodiment

Figure 11A:
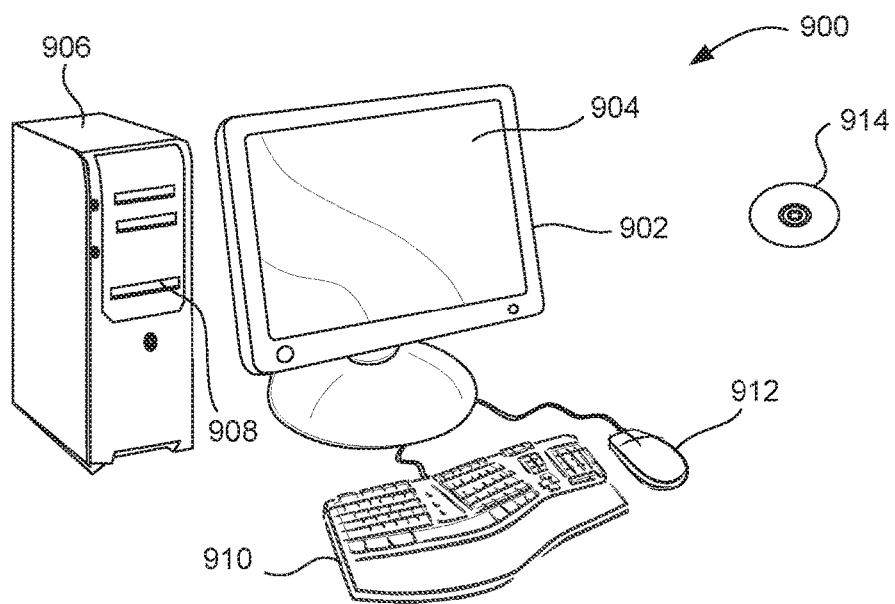
FIGS. 11A and 11B illustrate a computer system suitable for implementing embodiments of the present invention.
Figure 11B:
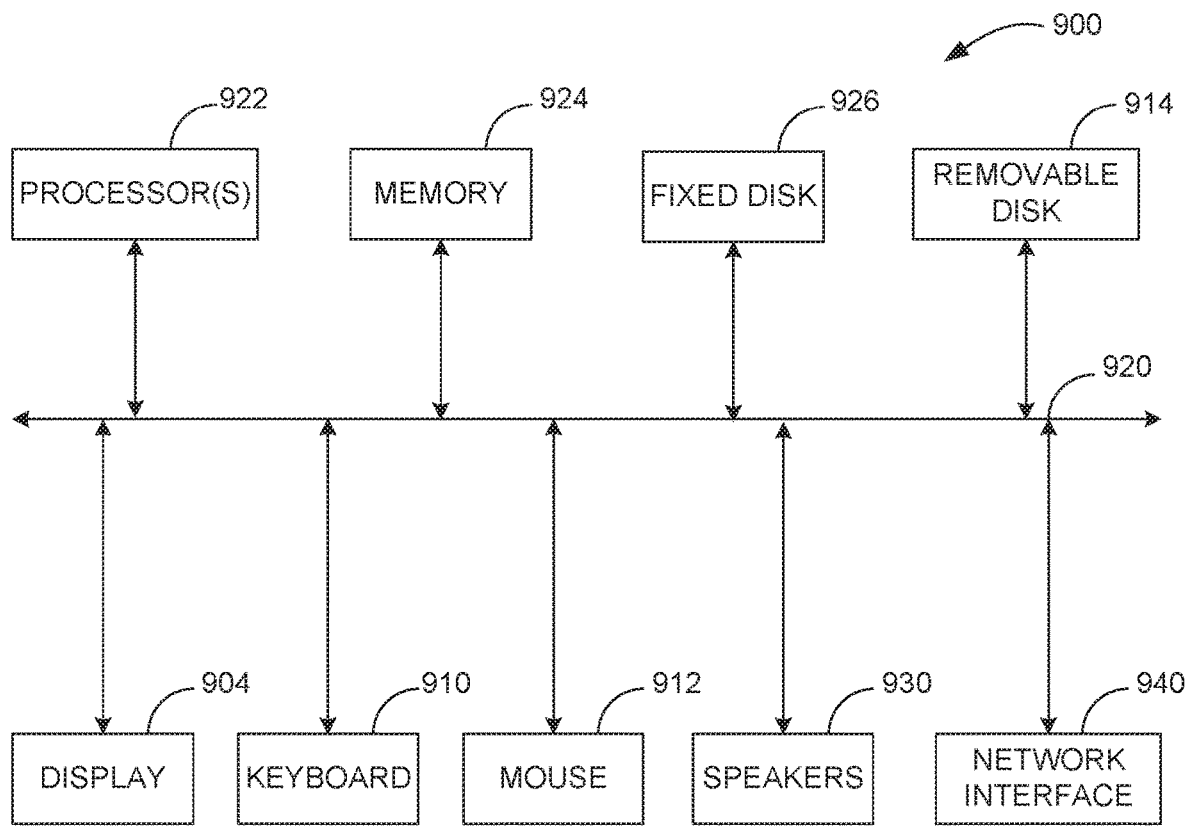

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. In a data storage platform comprising computer nodes, a method of synchronizing metadata between said computer nodes, said method comprising:
    identifying a first metadata file on a computer node, wherein said first metadata file includes a first plurality of key-value-timestamp triples each of which uniquely identifies a portion of metadata that pertains to a particular block of data that has been stored to a computer node of said data storage platform;
    retrieving from a computer node of said data storage platform a first fingerprint file that includes a plurality of first hash values, wherein each first hash value corresponds to a first region of said first metadata file, wherein each first region comprises one or more key-value-timestamp triples among said first plurality of key-value-timestamp triples;
    based on indicia that a second metadata file may be a replica of said first metadata file, retrieving from a computer node of said data storage platform a second fingerprint file that includes a plurality of second hash values, wherein each second hash value corresponds to a second region of said second metadata file, wherein each second region comprises one or more key-value-timestamp triples among a second plurality of key-value-timestamp triples in said second metadata file;
    based on comparing said plurality of first hash values to said plurality of second hash values, determining that first hash values not present among said plurality of second hash values correspond to missing regions of said second metadata file;
    identifying in said first metadata file one or more key-value-timestamp triples among said first plurality of key-value-timestamp triples that correspond to said first hash values not present among said plurality of second hash values;
    transmitting to said second metadata file said identified one or more key-value-timestamp triples among said first plurality of key-value-timestamp triples;
    determining that second hash values not present among said plurality of first hash values correspond to missing regions of said first metadata file; and
    identifying in said second metadata file one or more key-value-timestamp triples among said second plurality of key-value-timestamp triples that correspond to the second hash values not present among said plurality of first hash values.

2. A method as recited in claim 1 further comprising:
    compacting said second metadata file with said transmitted one or more key-value-timestamp triples received from said first metadata file in order to create a new version of said second metadata file.

3. A method as recited in claim 1 wherein said first metadata file and said second metadata file are located on different computer nodes of said data storage platform and have a same file identifier, and wherein said indicia that the second metadata file may be a replica of said first metadata file is based on the same file identifier.

4. A method as recited in claim 1 wherein said first fingerprint file and said second fingerprint file are retrieved from the same computer node.

5. A method as recited in claim 1 further comprising:
    transmitting to said first metadata file said identified one or more key-value-timestamp triples among said second plurality of key-value-timestamp triples.

6. A method as recited in claim 5 further comprising:
    compacting said first metadata file with said transmitted one or more key-value-timestamp triples received from said second metadata file in order to create a new version of said first metadata file.

7. A method as recited in claim 1 wherein said first metadata file and said second metadata file are stored on disk by respective computer nodes of said data storage platform that use a same file identification scheme.

8. A method as recited in claim 1 wherein said first fingerprint file comprises start-length-hash value triples that correspond to first regions of said first metadata file, and wherein a hash value in each start-length-hash triple is a first hash value among the plurality of first hash values in the first fingerprint file.

9. A system comprising a data storage platform comprising:
    a plurality of computer nodes, wherein each computer node is configured to:
    identify a first metadata file on one of the plurality of computer nodes, wherein said first metadata file includes a first plurality of key-value-timestamp triples each of which uniquely identifies a portion of metadata that pertains to a particular block of data that has been stored to a computer node;

retrieve from one of the plurality of computer nodes a first fingerprint file that includes a plurality of first hash values, wherein each first hash value corresponds to a first region of said first metadata file, wherein each first region comprises one or more key-value-timestamp triples among said first plurality of key-value-timestamp triples;

based on indicia that a second metadata file may be a replica of said first metadata file, retrieve from one of the plurality of computer nodes a second fingerprint file that includes a plurality of second hash values, wherein each second hash value corresponds to a second region of said second metadata file, wherein each second region comprises one or more key-value-timestamp triples among a second plurality of key-value-timestamp triples in said second metadata file;

based on comparing said plurality of first hash values to said plurality of second hash values, determine that first hash values not present among said plurality of second hash values correspond to missing regions of said second metadata file;

identify in said first metadata file one or more key-value-timestamp triples among said first plurality of key-value-timestamp triples that correspond to said first hash values not present among said plurality of second hash values;

transmit to said second metadata file said identified one or more key-value-timestamp triples among said first plurality of key-value-timestamp triples;

determine that second hash values not present among said plurality of first hash values correspond to missing regions of said first metadata file; and identify in said second metadata file one or more key-value-timestamp triples among said second plurality of key-value-timestamp triples that correspond to the second hash values not present among said plurality of first hash values.

10. The system of claim 9, wherein each computer node is further configured to:

compact said second metadata file with said transmitted one or more key-value-timestamp triples received from said first metadata file in order to create a new version of said second metadata file.

11. The system of claim 9, wherein said first metadata file and said second metadata file are located on different computer nodes of said data storage platform and have a same file identifier, and wherein said indicia that the second metadata file may be a replica of said first metadata file is based on the same file identifier.

12. The system of claim 9, wherein said first fingerprint file and said second fingerprint file are retrieved from the same computer node.

13. The system of claim 9, wherein each computer node is further configured to:

transmit to said first metadata file said identified one or more key-value-timestamp triples among said second plurality of key-value-timestamp triples; and compact said first metadata file with said transmitted one or more key-value-timestamp triples received from said second metadata file in order to create a new version of said first metadata file.

14. The system of claim 9, wherein said first metadata file and said second metadata file are stored on disk by respective computer nodes of said data storage platform that use a same file identification scheme.

15. A non-transitory computer-readable medium comprising instructions that, when executed by a first one of a plurality of computer nodes that form a data storage platform, cause the first computer node to:

identify a first metadata file on one of the plurality of computer nodes, wherein said first metadata file includes a first plurality of key-value-timestamp triples each of which uniquely identifies a portion of metadata that pertains to a particular block of data that has been stored to a computer node;

retrieve from one of the plurality of computer nodes a first fingerprint file that includes a plurality of first hash values, wherein each first hash value corresponds to a first region of said first metadata file, wherein each first region comprises one or more key-value-timestamp triples among said first plurality of key-value-timestamp triples;

based on indicia that a second metadata file may be a replica of said first metadata file, retrieve from one of the plurality of computer nodes a second fingerprint file that includes a plurality of second hash values, wherein each second hash value corresponds to a second region of said second metadata file, wherein each second region comprises one or more key-value-timestamp triples among a second plurality of key-value-timestamp triples in said second metadata file;

based on comparing said plurality of first hash values to said plurality of second hash values, determine that first hash values not present among said plurality of second hash values correspond to missing regions of said second metadata file;

identify in said first metadata file one or more key-value-timestamp triples among said first plurality of key-value-timestamp triples that correspond to said first hash values not present among said plurality of second hash values;

transmit to said second metadata file said identified one or more key-value-timestamp triples among said first plurality of key-value-timestamp triples;

determine that second hash values not present among said plurality of first hash values correspond to missing regions of said first metadata file; and identify in said second metadata file one or more key-value-timestamp triples among said second plurality of key-value-timestamp triples that correspond to the second hash values not present among said plurality of first hash values.

16. The non-transitory computer-readable medium of claim 15, wherein each computer node is further configured to:

compact said second metadata file with said transmitted one or more key-value-timestamp triples received from said first metadata file in order to create a new version of said second metadata file.

17. The non-transitory computer-readable medium of claim 15, wherein said first metadata file and said second metadata file are located on different computer nodes of said data storage platform and have a same file identifier, and wherein said indicia that the second metadata file may be a replica of said first metadata file is based on the same file identifier.

18. The non-transitory computer-readable medium of claim 15, wherein said first fingerprint file and said second fingerprint file are retrieved from the same computer node.

19. The non-transitory computer-readable medium of claim 15, wherein each computer node is further configured to:

transmit to said first metadata file said identified one or more key-value-timestamp triples among said second plurality of key-value-timestamp triples; and compact said first metadata file with said transmitted one or more key-value-timestamp triples received from said second metadata file in order to create a new version of said first metadata file.

20. The non-transitory computer-readable medium of claim 15, wherein said first metadata file and said second metadata file are stored on disk by respective computer nodes of said data storage platform that use a same file identification scheme.

\* \* \* \* \*